United States Patent [19]

Porter, Jr.

[11] 4,310,988
[45] Jan. 19, 1982

[54] APPARATUS FOR SELECTIVE FIELD APPLICATION OF HERBICIDES TO WEEDS

[76] Inventor: George D. Porter, Jr., P.O. Box 1887, Lubbock, Tex. 79408

[21] Appl. No.: 95,371

[22] Filed: Nov. 19, 1979

[51] Int. Cl.³ ............................................. A01M 21/00
[52] U.S. Cl. ...................................... 47/1.5; 239/145
[58] Field of Search ........................ 47/1.5; 222/187; 239/145, 163

[56] References Cited

U.S. PATENT DOCUMENTS

| | | | |
|---|---|---|---|
| 480,047 | 8/1892 | Steitz . | |
| 910,933 | 1/1909 | Mahanay . | |
| 1,416,065 | 5/1922 | Rhodes | 239/121 |
| 1,416,065 | 5/1922 | Rhodes | 299/41 |
| 1,500,162 | 7/1924 | Tate | 299/30 |
| 1,507,595 | 9/1924 | Goode | 299/30 |
| 1,518,305 | 12/1924 | Carmans | 299/39 |
| 1,523,590 | 1/1925 | Hartshorn | 299/41 |
| 1,527,669 | 2/1925 | Camp | 47/1.5 |
| 1,539,789 | 5/1925 | Walker | 299/41 |
| 1,551,327 | 8/1925 | Pearce | 299/30 |
| 1,566,714 | 12/1925 | Wilson et al. | 299/30 |
| 1,568,448 | 1/1926 | Freeman | 299/30 |
| 1,672,058 | 6/1926 | Cole | 299/38 |
| 1,764,952 | 6/1930 | Hay | 299/30 |
| 1,818,369 | 8/1931 | Watson et al. | 299/30 |
| 1,825,648 | 9/1931 | Hewitt | 299/30 |
| 2,158,115 | 5/1939 | Fullilove | 47/1.5 |
| 2,200,242 | 5/1940 | Neil et al. | 299/29 |
| 2,311,782 | 2/1943 | Segars | 47/1.5 |
| 2,988,849 | 6/1961 | Laughlin | 47/1.5 |
| 3,009,290 | 11/1961 | Bratton | 47/1.5 |
| 3,021,642 | 2/1962 | Ewing | 47/1.5 |
| 3,077,701 | 2/1963 | Osmun | 47/1.5 |
| 3,096,534 | 7/1963 | Jones | 15/244 |
| 3,123,988 | 7/1938 | Corley | 47/1.5 |
| 3,198,396 | 9/1965 | Bailey | 222/176 |
| 3,212,216 | 10/1965 | Ludwig | 47/1.5 |
| 3,314,190 | 4/1967 | Ridgway et al. | 47/1.5 |
| 3,320,694 | 5/1967 | Biron | 47/1.5 |
| 3,584,787 | 6/1971 | Thomason | 239/121 |
| 3,651,600 | 3/1972 | Ewing | 47/1.5 |
| 3,728,817 | 4/1973 | Huey et al. | 47/1.5 |
| 4,019,278 | 4/1977 | McKirdy | 47/1.5 |
| 4,139,156 | 2/1979 | Field et al. | 239/121 |
| 4,143,839 | 8/1964 | Johnson | 56/23 |
| 4,187,638 | 2/1980 | Hardy et al. | 47/1.5 |
| 4,219,964 | 9/1980 | Dale | 47/1.5 |

FOREIGN PATENT DOCUMENTS 32671 10/1964 Fed. Rep. of Germany ......... 47/1.5

OTHER PUBLICATIONS

"The Rope Wick Applicator", Dale, Jul. 5, 1978, USDA-Sea.
"Rope Wick Applicators:", Jan. 1981, Successful Farming.

Primary Examiner—Steven A. Bratlie
Attorney, Agent, or Firm—Dennis T. Griggs

[57] ABSTRACT

An apparatus and process applying herbicide-containing liquid to weeds in a field also containing growing cultivated crops neighboring said weeds comprises means for moving an apparatus that transports a load of herbicide-containing liquid in a reservoir therefor along that field and then distributing that liquid from that reservoir to a weed-contacting surface: the pressure-controlled liquid reservoir provides the herbicide-containing liquid to any array of dispenser units arranged to rapidly and reliably and selectively and efficiently apply such herbicide-bearing liquid to the surface of weed plants in the field projecting above a neighboring cultivated crop without misapplication of such herbicide-containing liquids to such neighboring crops.

1 Claim, 14 Drawing Figures

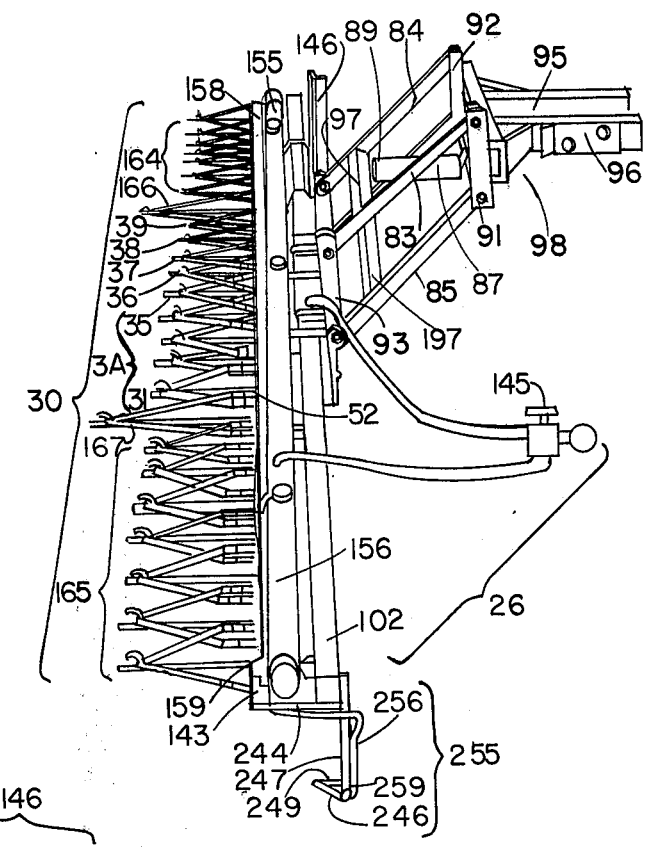
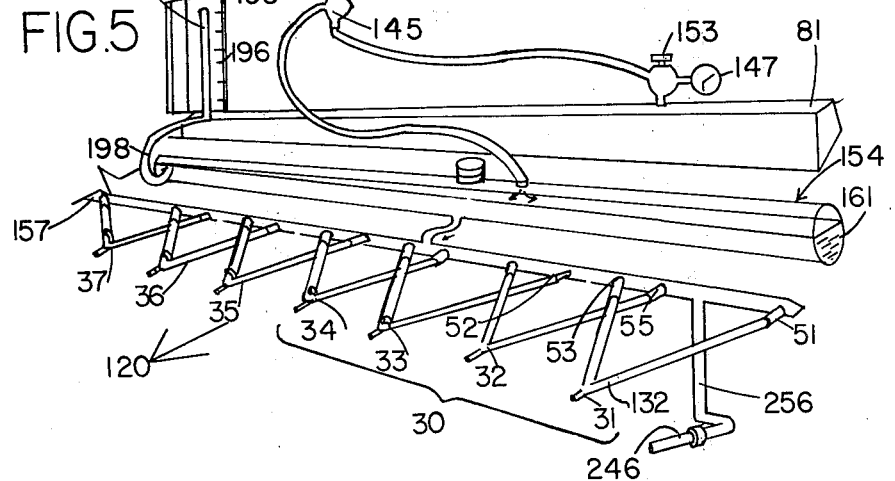

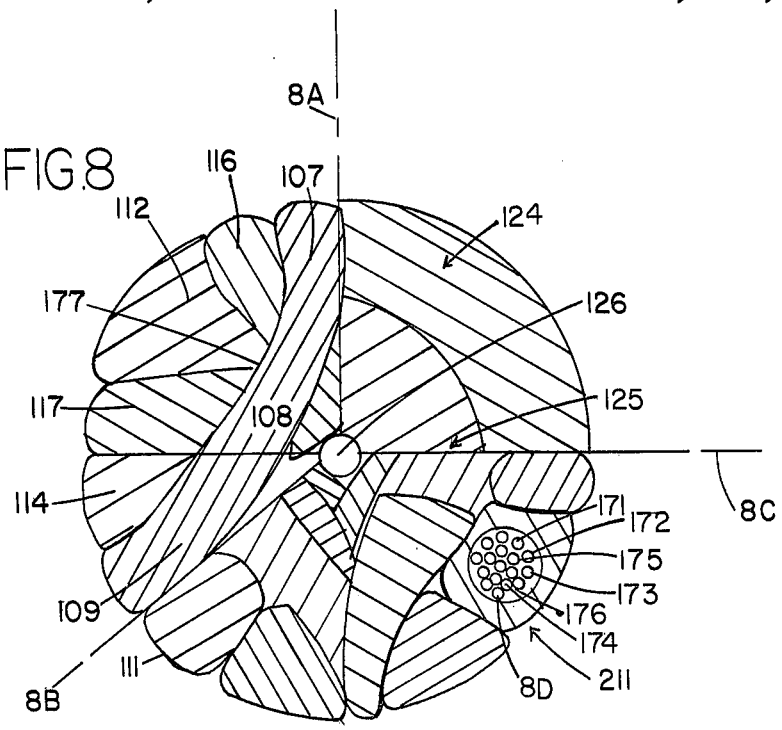
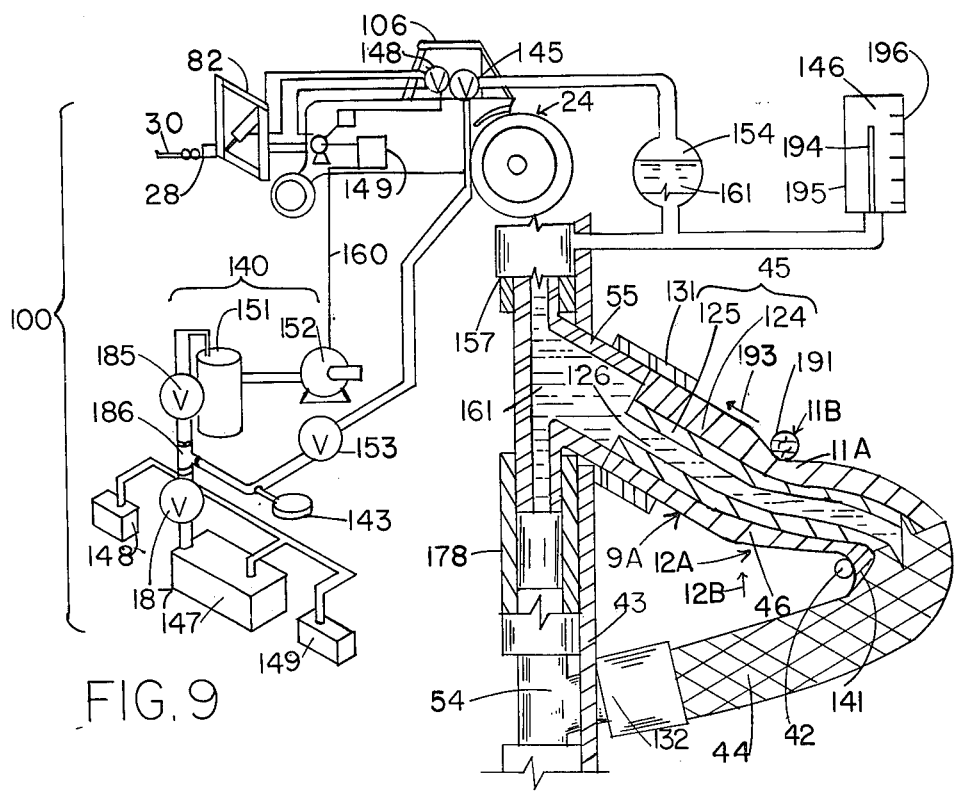

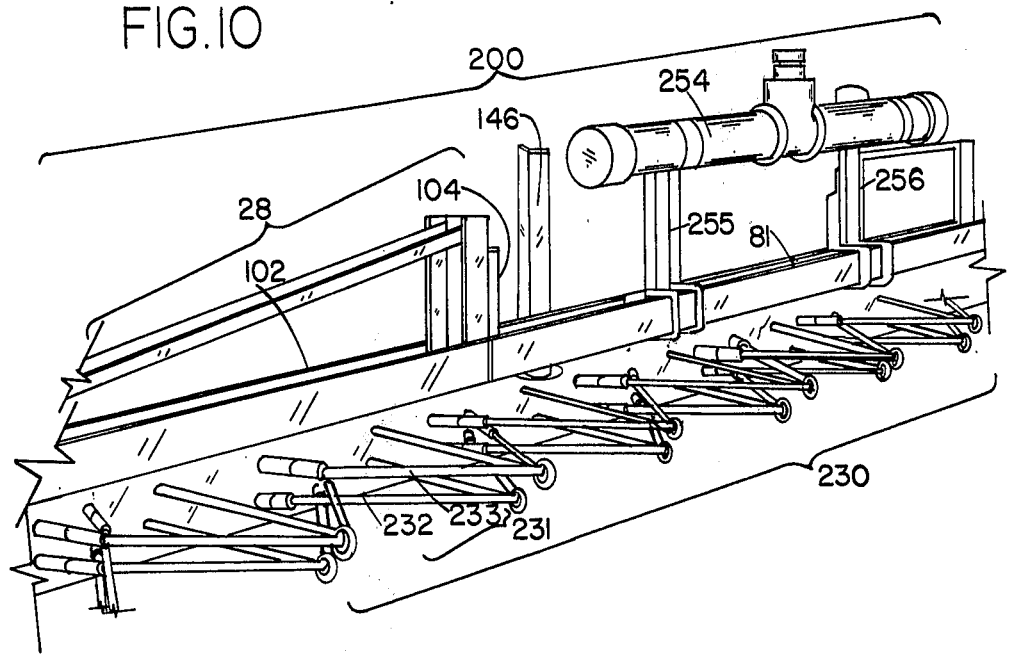
FIG.10
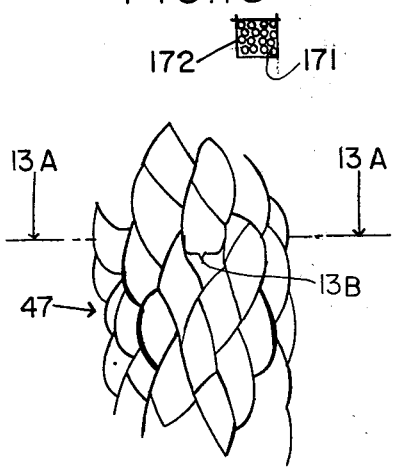
FIG.13
FIG.11
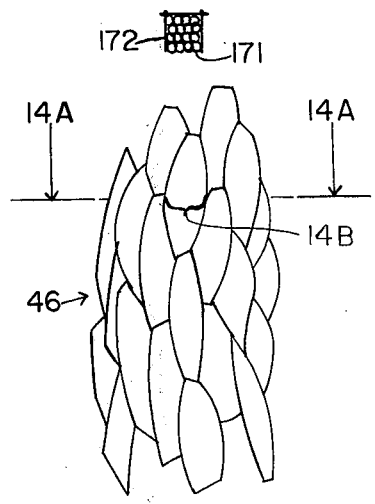
FIG.14
FIG.12

APPARATUS FOR SELECTIVE FIELD APPLICATION OF HERBICIDES TO WEEDS

BACKGROUND OF THE INVENTION

1. Field of the Invention

The field of art to which this invention pertains is plant husbandry using surface contact material applicators, and dispensing using wick absorbents.

2. Description of the Prior Art

The prior art has used mop-like structures held at a fixed height over crops to apply liquids to those crops as in U.S. Pat. No. 3,198,396 2,311,782; 2,123,988; 1,527,669. While such apparatuses applied herbicide to the higher crops it also provided dripping onto the crops therebelow which were desired to be protected. Additionally, such prior art provided that the liquid dispensed was dispensed from the convex side of the mop or liquid-containing mat which, as hereinbelow described, is an inefficient surface from which to attempt to effect such dispensing with the result that application by such methods was inefficient and the crops sought to be contacted by the herbicide only had a limited or reduced amount of liquid applied thereto [as compared to the adequate amount which is applied by this apparatus which provides that the crop contacted is contacted by the most efficient portion of the applicator for such dispensing]. Other apparatuses as the "Lightning Rod" applicator of Hardy Roberson, Inc. Batesville, Mississippi use rope wicks extended and supported in a direction perpendicular to the direction of travel of the dispensing apparatus whereby the dispensing effected on contact of the rope with the to-be treated plant is not accomplished with the utilization of the rapid and selective action that is effected by use of development of a concave surface at the point of contact of weeds and the applicator and the use of a constant pressure to provide increased liquid flow to portions of the wick which are contacted by weeds and should be immediately be given a substantial flow of treating liquid.

Also, in ropes extending transversely of the direction of travel of the applicator as in the Bo-Bar applicators (of Hale Center, Tex.) not only is the zone of liquid application to a given plant limited to a narrow length of rope, hence limiting of the amount of liquid applicable to a given weed by a given applicator, but also such apparatus is without pressure control, which provides for a lack of discrimination between the amounts of liquid applied to the weed plant surface and the amount of liquid which merely leaks from the dispensing surface and is available to contact cultivated crop.

SUMMARY OF THE INVENTION

The herbicide dispensing apparatus and process herein provide a combination of means and steps for (a) vertical wick positioning, with respect to distinguishing between weeds to which herbicide liquid is to be applied and crops to which such liquid is not to be applied, (b) angular orientation of deformable porous-walled conduit surfaces to provide, in view of speed of travel of the apparatus carrying the herbicide applicator apparatus, a sufficient length of contact area along successive positions of contact of wick and weed surfaces to provide time of liquid dispensing during the periods of contact of surfaces of wick and weed for an effective volume of dispensed liquid in view of the finite rate of flow of liquid through the walls of the applicator, and (c) a closely controlled pressurized liquid supply to provide effective and controllable discrimination between the operating conditions of (i) liquid retention between periods of application and (ii) immediate liquid dispensing at time of contact of weed surface and herbicide applicator.

Although liquids used as herbicides are toxic and the dissemination of these materials can be dangerous to the health of the operator if there is indiscriminate dispersal of such liquids—and the chemicals resulting from their drying in air, the apparatus and process herein contains such liquids without leakage thereof notwithstanding the agitation and bumpiness of the path of such apparatus in the field. At the same time the apparatus herein is extremely efficient in providing immediate dispensing and application of such solution as needed for the periods of contact of the weed with the moving dispensing element on the apparatus. Such dispensing and application is accomplished without delay at the precise periods of contact of the chemical dispensing apparatus with the weed stem. This dispensing is accomplished by selective maintenance of pressure on liquid to angled deformable wick structures whereby there is no leakage of the toxic solution to areas of plants from which misapplication no benefit is derived.

BRIEF DESCRIPTION OF THE DRAWINGS

FIG. 4 is a side and top oblique view, as seen along the direction of arrow 4B of FIG. 1, showing the array of wick assemblies and adjacent parts in operative position.

FIG. 5 is a diagrammatic exploded perspective view of the larger components of apparatus 20 illustrating their functional relationships.

FIG. 8 is a composite of four diagrammatic sectional views; Sector 8A-8B is a diagrammatic view along a diagonal section as plane 6A-6B of FIG. 7; sector 8B-8C is a diagrammatic view along a transverse cross-sectional plane as 6C-6D of FIG. 7; Sector 8C-8A shows a schematic representation of the wick wall zones as shown in zone 9A of FIG. 9. A greatly enlarged cross-section portion of one strand is shown in zone 8D.

FIG. 9 is a diagrammatic presentation of the functional relationships between (a) the components of apparatus 20 and assembly 100 for pressurizing the herbicide-containing liquid, and (b) the straight portion of a wick unit and the bent portion of a wick unit and (c) a weed plant surface to which liquid is applied by apparatus 20.

FIG. 10 is a front and top oblique view of portions of another embodiment of apparatus according to this invention, embodiment 200.

FIG. 11 is a diagrammatic view of structures in zone 11A of FIG. 9, as seen along the direction of arrow 11B in FIG. 9, of a concave portion of wick unit where contacted and bent by a weed plant component.

FIG. 12 is a diagrammatic view of structures in zone 12A of FIG. 9 as seen along direction of arrow 12B of FIG. 9 of a convex portion of a wick unit on the side of the wick unit opposite to the portion thereof contacted by a weed plant component.

FIGS. 13 and 14, respectively, are enlarged diagrammatic views respectively of a section along plane 13A—13A of FIG. 11 and along plane 14A—14A of FIG. 12 to illustrate filaments and interfilamentary spacing in the position of components shown in FIGS. 11 and 12 respectively.

FIGS. 1–5 and 10 are pictorial and dimensions and relative sizes of components may be estimated therefrom. FIG. 6 is a photograph and, especially in view of additional information thereon provided in the text following, dimensions and surface texture may be determined therefrom. FIG. 7 is a line drawing from the photographic view shown in FIG. 6 and, from the information in the text following, dimensions and relative sizes may be approximated therefrom. FIGS. 8 13 and 14 are drawn to scale, and, from information given thereon in the text following, dimensions and relative sizes may be approximated therefrom.

DESCRIPTION OF THE PREFERRED EMBODIMENT

Figure 1:
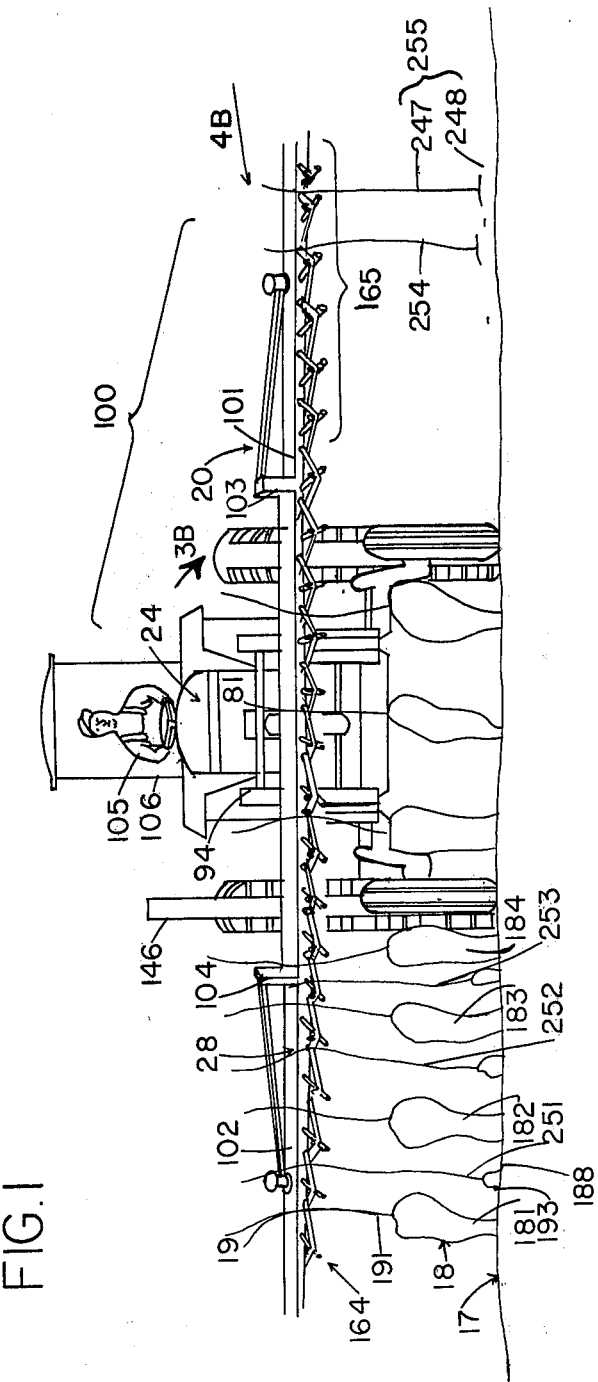
FIG. 1 is an overall front view of an assembly 100 comprising a herbicide dispensing apparatus 20 according to this invention on a tractor 24 and shows, on the right hand portion thereof, the operative relationship of the wick assemblies of the apparatus 20 to (a) the weed plant portions selectively contacted thereby, and to (b) the cotton plants not treated by the wick assemblies.

The embodiment of overall assembly 100 comprises, in operative combination, a wheeled tractor 24, and a selective herbicide dispensing apparatus 20. These components are cooperatively connected and selectively operate on the weeds 19 located between and adjacent to crops 18 in a field 17.

The selective herbicide dispensing apparatus 20 comprises a wick array frame assembly 28, a controlled pressure liquid assembly 26 and a wick assembly array 30. The wick array frame assembly 28 is supported on the tractor 24 and supports the wick assembly array 30. Some parts of the controlled pressure liquid reservoir assembly are supported on the tractor 24 and other parts thereof are supported on the wick array frame assembly 28. The terms "left" and "right" as used herein refer, respectively, to the left and right side as viewed by an operator, as 105, seated in the cab 106 of the tractor 24 and facing forward in the forward direction of travel of the tractor, shown in FIGS. 1 and 2 as 120.

The wick array frame assembly 28 comprises rigid horizontally extending beam assembly 80 and a parallelogram linkage assembly 82. The beam assembly 80 comprises a rigid center beam 81, a rigid left side beam 101 and a rigid right side beam 102. These beams are rigid steel box beams. The rigid center beam 81 is attached firmly to and firmly supports a left vertically extending hinge support arm 103 for pivotal support of the left side beam 101 and a right vertically extending hinge support arm 104 for pivotal support of the right side beam 102.

As each of beams 81, 101 and 102 (281 and 282) is a rigid horizontally extending square sectioned tubing and is closed at its ends, each of the beams also serves as a manifold for primary air pressure (e.g. 147, 148 and 149).

The linkage assembly 82 comprises a top left diagonally extending rigid link 83, a top right rigid diagonally extending link 84, a bottom left diagonally extending rigid link 85, a bottom right diagonally extending rigid link 86, a vertical left base arm 91, a vertical right base arm 92, a front left movable vertical rigid arm 93, a right front movable vertical rigid arm 94, and a piston and cylinder assembly 87. A piston 89 of the cylinder assembly 87 is longitudinally movable within the cylinder 88 of the piston and cylinder assembly 87. A rear transverse beam 98 extends transversely and horizontally and is firmly attached to vertical base members 91 and 92. A front transverse beam 97 extends transversely and horizontally and is firmly attached to bottom diagonal arms 85 and 86. Beam 97 connects upper diagonal arm 83 and 84. The rear end of cylinder and/or piston and cylinder assembly 87 is pivotally attached to the rear transverse member 98; the front end of piston 89 of the piston and cylinder assembly 87 is pivotally attached to the front transverse rigid horizontal member 97.

The front and rear ends of the left arms 83 and 85 are pivotally joined to the left rear vertical arms 91 and 93; the front and rear ends of the right diagonal arms 84 and 86 are pivotally joined to right vertical arms 92 and 94. The arms 93 and 94 are firmly attached to and support the center beam 81. The piston assembly 87 is operatively connected to the hydraulic system of the tractor 24 and serves to raise and lower the beams 81, 101 and 102 relative to the ground 27 on which the tractor operates. Generally, the apparatus 100 advances through a field bearing cultivated crops as 18 and weeds as 19, with the wick units of assembly 20 maintained at such height over the field 17 by adjustment of the parallelogram linkage 82 as to be above the cultivated plants, as cotton plants 18, but not above the level of the weeds neighboring with the cultivated plants. The wick elements contact the leaves and stems of the weeds and selectively apply herbicide-bearing liquid thereto.

The controlled pressure liquid reservoir assembly 26 comprises an air tank 151, pump 152, pressure regulator 153, herbicide liquid supply tanks 154, 155, 156 and hose manifolds 157, 158 and 159 and a power take-off 160 from the tractor 24.

The herbicide liquid supply tanks 154, 155 and 156 are rigid hollow cylindrical tanks supported on the beams 81, 101 and 102. These tanks each operatively connect to a horizontally transversely extending manifold as 157, 158 and 159, each of which is also supported on extensions of the beams 81, 101 and 102 and connect to wick assemblies as 31–39 for manifold 157. Manifolds 158 and 159, respectively, similarly operatively connect to groups 164 and 165, respectively, of wick assemblies, which wick assemblies are similar in structure and function to wick assemblies 31–39.

Each of the wick assemblies as 32 comprises (a) a pair of wick units 44 and 45 and (b) a rigid wick support bar as 41 with a hook 42 in its front. Each bar as 41 is firmly connected at its rear to a rigid horizontally extending wick support plate 43. The hose manifold 157 is supported on the beam 81 and has a plurality of connector nozzles as 51–59. Each of the connector nozzles as 54 and 55 is respectively, connected to the rear end of a wick unit as 44 and 45 respectively. Each hook as 42 of each of the wick assemblies as 31–39 projects forwardly the same distance of the plate 43 and supports the front end of each wick unit. The wick units provide for dispensing of the liquid held in the wick unit to the taller elements in the field such as weeds for selective application of the liquid to such elements.

Compressed air is contained and held in the center section manifold 157 on the beam or toolbar 81. Operational pressure is 5 to 100 psi. Optional air compressor kit 140 maintains a steady pressure of 20–40 psi. Primary air pressure flows through valve 153 mounted on the toolbar to cab-mounted precision regulator 145 and special pressure gage 146 which indicates secondary pressure from 0–36 inches water column. Regulated pressure then flows to the top of the chemical tanks as 154, 155 and 156 and forces the chemical 161 out and into the hose manifolds 157, 158 and 159 to which the ropes or wick units as 44 and 45 are connected.

Figure 6:
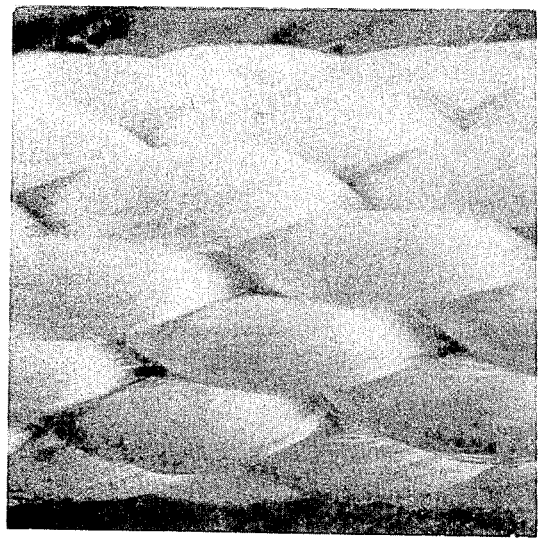
FIG. 6 is a macro-photograph perspective view of a portion of the wick in zone 6A of FIG. 3 to show details of surface structure, texture and size of the portions thereof.
Figure 7:
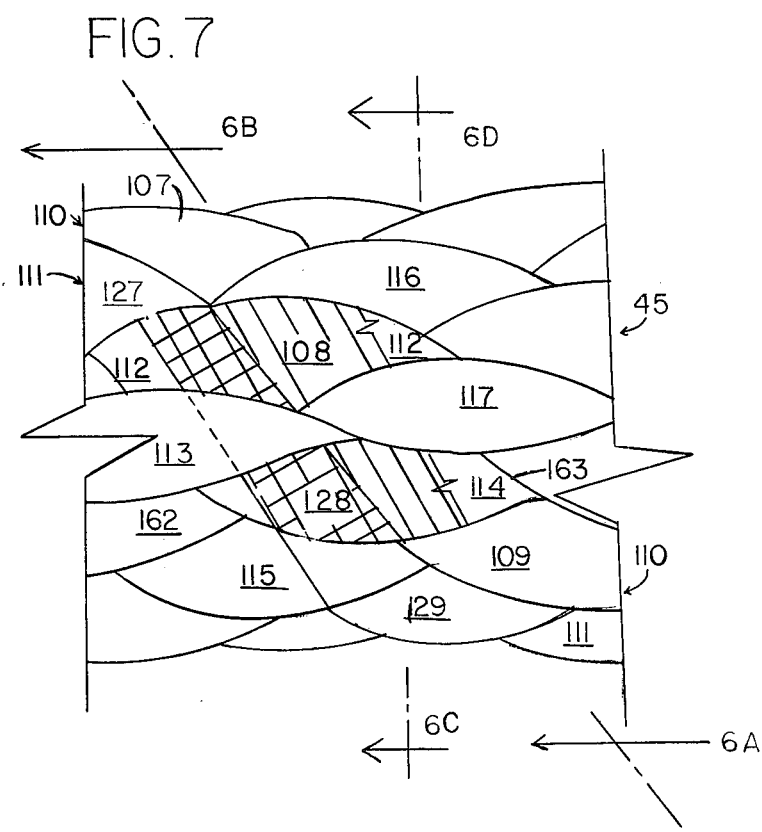
FIG. 7 is a diagrammatic view corresponding to FIG. 6 partly broken away to show relations of components shown in FIG. 6 and not interfere with the showing of macroscopic structure provided in FIG. 6.

Each wick unit as 45 is circular in section as shown in FIG. 8 and is about 1.4 cm. in diameter and made of multiple strands as 111–117, and 211, each 3 mm. diameter when in circular form. Each strand as 111 is composed of about 10,000 fibers, about 0.03 mm. diameter. The fibers are parallel to each other in each strand. The strands weave relative to each other, as shown in FIGS. 6–8. Each strand as 110 as shown in FIGS. 6–8 is composed of a series of peripherally located longitudinally extending portions as 107 and 109 and intermediate helically extending interior portions, as 108. Similarly, another strand, 111, is composed of a series of first longitudinally extending peripheral portions, as 127, second interior helical portion as 128, and third longitudinally extending peripheral portions as 129. Each strand, as 110, overlies the helical portion of four other strands in its peripheral portion and then passes interiorly; in such interior helical location, peripheral portions of four other strands, as 112, 113, 114 and 117, pass over the helical portion. A small core or empty space 126 about 1/16 in. diameter extends along the length of the wick unit. Each wick unit as 44 is thus composed of (a) an outer or radial zone 124 of densely packed longitudinally extending peripheral strand portions, as 107, 109, 127 and 129, and like portions of strands as 112–117 and 211, which are formed of densely packed filaments, as 171–174 and, centrally thereof, (b) an inner zone 125 formed of helically extending strand portions as 108 and 128 where the filaments are only loosely packed and (c) a central portion 126 of the wick which is empty of filaments. The entire wick structure is thus a conduit with wall portions of varying porosity. The porosity of the different increments of volume of the wick portions varies not only with (a) the position of the particular volume portion—being more porous in the centrally located portions and more densely packed in the radial or peripheral portions—but also (b) as the shape of the wick varies due to bending of the wick unit, the spaces between the filaments varies.

The rear end of each wick unit as 44 and 45 is held firmly by a sleeve 131 and 132 respectively: the spaces between the peripheral portions of the strand ends and each sleeve is filled with a water-impermeable resin and the interfilamentary spaces between the filaments in each longitudinally extending strand portion adjacent to the sleeves (as 131 and 132) are also filled with such resin, so that within each sleeve each wick unit provides for flow of the liquid only in the inner portion of the strand along the length of the wick held within the sleeve and within the central portion 126.

In each wick unit as 44, liquid held in the interfilamentary spaces as 175 and 176 of one strand, as 112, does not pass to the interfilamentary spaces of another adjacent strand because the interstrand spaces as 177 are usually large relative to the interfilamentary spaces. This localization of liquid results from that the capillary forces of the interfilamentary surfaces serve to hold and contain the liquid in the strands, and the interfilamentary passageways thereby form an effective conduit from the core 126 (and manifold 157 and container 154) to the surface of the wick units; however, the small transverse cross sections of those interfilamentary passages provide resistance to the passage of liquid therealong.

Liquid passes from the pressurized tank 154 and hose along the cores of each wick unit and along the interfilamentary spaces between the filaments forming the strands. The capillary forces serve to hold the liquid and form a conduit for the liquid from core space 126 to the surface of the wick although the filaments do not form a continuous wall. However, the narrow interfilamentary passages provide resistance to liquid flow along the length of such passages to a degree generally inversely proportional to the cross sectional area of such passages. Accordingly, the determining factor as to whether or not liquid will pass from the tank 114 and manifold as 115 and core 126 to a weed plant surface contacted by the wick unit is resistance to liquid flow provided by the narrow conduit formed by the interfilamentary spaces; the narrowest spaces are located between the most closely spaced filaments, which are the filaments located at the periphery of the strands.

As each wick unit as 45 is flexible and supported on the moving assembly 100 it is bent on contact with a surface 191 of the weed plant structure contacting such wick unit or rope in the area of such contact in view of the underlying structure for that weed plant surface being relatively firmly attached to the ground. As shown in FIG. 9 each wick unit forms a concave or wide-angled V with the angle open to or directed towards the weed plant portions causing the deformation of the wick unit.

The position of the vertex of the angle moves along the length of the wick as the wick (and the apparatus 100) move relative to the fixed point of attachment as 192 (FIG. 2) of the weed stem 192 to the ground. However, the relations of the vertex of angle and location of the contact area of the weed plant portion and wick remain the same, i.e. the contact area of the weed plant portion and the wick is the location of the vertex of the angle formed by the deformation of the wick unit. On bending of the entire wick unit as 44 forming a convex side as 46 and concave side 47 the peripheral longitudinally extending portions of the strands on the convex side and of the wick become elongated and narrower and the filament in those strands are drawn closer together with less space between the filaments in each strand. While on the concave portion, shown in FIG. 11, such bending concurrently causes shortening of the strands between the points as 162 and 163 where the longitudinally extending peripheral strand portions join helical strand portions of the same strand and whereat the strand as 114 passes under other strands, as 113, and passes below the surface of the wick. At such portion of the strand which has been shortened, the filaments are (a) under less tension and (b) are spaced [measured transversely to their length], further apart from each other than are the filaments in the portion of the strands which are on the convex side of the wick. Liquid is held less firmly by capillary action to (a) the filaments on the concave side that are further apart from each other than (b) the filaments that are closer to each other [as on the convex side of the wick]. The shape of the longitudinally extending peripheral portions of the strands changes when the wick unit is deformed by contact of the wick unit by a weed stem or leaf and such deformation of the strands, as shown in FIGS. 9 and 11, provides for an increase in the interfilamentary spaces between the filaments forming the strands at the area of contact of such strand with the weed plant and such increase in interfilamentary space permits an increased flow of herbicide bearing liquid from the core 126 of the wick unit to such zone of contact and application of such liquid to the plant surface causing such deformation of the wick strand, at a fixed pressure of liquid in each hose manifold as 157, 158 and 159. Contact of weed surfaces with the concave side of the wick provides rapid transfer of the liquid under pressure to the weed surface contacted by the wick. Also, varying degrees of rate of flow of fluid to the periphery of the strands of the wick on bending of the wick are obtained easily and simply by adjusting the cab-mounted regulator 145. With a closely regulated liquid pressure, as provided by regulator 145 to the hose manifold, the pressure applied to the liquid is not great enough to overcome the resistance provided by the stretched fibers on the convex portions of the wick or in the straight portions of the wick but is strong enough to flow past the zones whereat the wick is concave and interfilament space increased, whereby the only place for discharge of the liquid is at zone of contact of the weed stem and the peripheral surface portion of the rope or wick unit as 45.

The wick units 31–39 extend in a horizontal plane parallel to the ground and at an angle of 45 degrees to the path of travel 120 of the apparatus 100. The apparatus 100 travels along the field as in a direction 120 parallel to the rows of cultivated crops as 181–184. The wick units are arranged so that the rods thereof as 41 are spaced apart the transverse distance of the rows of crop as 181–183 from each other. Accordingly each weed plant portion as 191 contacted by the wick units slides along the periphery of each wick unit causing a movement of the vertex point of the bent wick as in direction 193 (FIG. 9) and each weed surface is exposed to a series of successive positions of contact of wick surface and weed surface to provide, at each of those successive positions, an additional volume of liquid applied to the weed plant surface. Thereby, during such finite time of contact, dependent on the rate of speed of the tractor 24 and the length of wick unit, a substantial amount of liquid is applied to each weed surface in a reliable fashion, although at each instantaneous position, only a small amount of liquid is applied.

The hose nozzles as 51–59 are firmly connected to the wick support plate 43 and the sleeves as 131 connect the nozzles to the wick unit. The fixed spatial relationship of pressurized liquid containing tanks 154, 155 and 156 to the manifolds 157, 158, and 159 and the steady pressure applied to those tanks provide steady pressure to the hose manifolds and to the wick units connected thereto notwithstanding variation in height of the hose manifold and wick units over the ground on which the apparatus 100 travels.

A cab controlled valve 148 connects from a hydraulic system actuated by the engine 149 of the tractor 24 to actuate the piston and cylinder assembly 87.

Rigid frame support arms 95 and 96 extend rearwardly from the base arms 91 and 92 to firmly connect the linkage assembly 82 to the frame of the tractor 24. The linkage assembly 82 also serves as a support during storage for the wick array frame assembly 28 following removal of the apparatus 20 from the tractor 24.

The embodiment of overall assembly of FIG. 10 comprises, in operative combination, a wheeled tractor as 24, and a selective herbicide dispensing apparatus 200. These components are cooperatively connected as in apparatus 100 and selectively operate on the weeds as 19 located between and adjacent to crops 18 in a field 17.

The selective herbicide dispenser apparatus 200 comprises wick array frame assembly 28, a controlled pressure liquid assembly as 26 and a wick assembly array 230. The wick array frame assembly 28 is supported on the tractor 24 and supports the wick assembly array 230.

The wick assembly array 230 is composed of wick pair assemblies as 231 in place of the wick units as each of 31–39. Each of the wick pair assemblies connected to the hose manifolds as 157, 158 and 159. Each wick pair assembly as 230 comprises two pairs of wick units, as 232 and 233 each like 33, one above the other and each connected to a hose manifold as 157, 158 or 159. The principle of operation of such wick units is as above described for the wick units as 32. Additionally, the chemical supply tank, as 254, is held above the tool bar or box beam as 81, by brackets as 255 and 256; the liquid and pressure connections of the tank 254 is the same as above described for supply tank 154 to the hose manifold and air compressor kit or air manifold 157.

The forward portion 141 of the outer layer, 125 of each wick assembly which engages the hook, as 42, is filled with resin and made impermeable to liquid, in the same manner that the rear end of each wick unit is filled with resin in its peripheral layers to avoid leakage of liquid past the sleeve as 131. Alternatively, the front end of each wick unit, as 44 may be joined to a sleeve as 132 of same structure as sleeve at its front and as well as at its rear end.

The particular embodiment shown as 100 has a width along beam 81 of 8½ feet; and 71 inches along each of beams 101 and 102; those beams are 3 inch square box beams. The rods as 41 of each unit as 31–39 are 15 inches long. Longer units as 166 and 167 have rods as 41 that are 20 inches long.

While the particular rope wicks as 44 and 45 shown are made of nylon, other wicks of similar internal structure may also be used.

The regulator 145 provides a control of pressure on the chemical containing liquid 161 in the tanks as 154, 155 and 156 of plus or minus one inch of water at any value between 2 and 60 inches of water. This provides a sufficiently delicate control to discriminate between period of contact by a weed structure and the wick units, as 31–39 by the response of a dispensing of liquid to the zone of contact while there is no dispensing of liquid from the core when there is no contact of the wick units by a weed structure, notwithstanding the roughness of ground surface traversed by the tractor 20 and the vibrations suffered by the beams as 81, 101, and 102 due to such terrain. The regulator and components of the reservoir assembly also provide for maintaining the pressure on the liquid 161 in the tanks as 154, 155 and 156 at any like steady value between 0 p.s.i.g. and 40 p.s.i.g. and so provides for handling liquid of different viscosities and at desired rates, while 6±¼ inches of water is usual.

While the particular wicks described are maintained under slight tension by the hooks as 42 on the rods as 41 so as to provide a droop of only ⅛ to ¼ inch over a two foot length, and so develop a vertex or angle where such units are contacted by weed structure surfaces, and so selectively apply liquid to such structure surfaces, those wick units also undergo radial deformation which also provides for change in porosity, and both such changes in porosity are effective to provide immediate flow and application of herbicide containing liquid to a zone of contact of such wick units with weed structure surfaces.

This pressure control of the liquid also allows selective liquid dispensing by use of generally cylindrical wicks of generally cylindrical outline having porous walls that are deformable radially—as also are the wick units as 44 and 45—to provide for increase in porosity at the zone of contact of wick and the weed surfaces as well as by the wicks that deform by change in shape of their axis, as do the wicks 44 and 45.

While the wicks as 31 and 32 are about 1.4 cm in diameter and generally circular in cross section, as shown in FIG. 8, on contact of such wicks with weed structure surface, the weed structure moves along the length of the wick structure and for a usual distance of 6 to 18 inches, and in almost all cases a distance of at least ten times the diameter of the wick, whereby, notwithstanding the relatively low rate of flow to the surface of the wick at the delicately controlled pressures of liquid therein, a substantial amount of herbicide-containing liquid is passed to the weed surface structure during the total treatment of such surface structures by the apparatus 100.

Figure 3:
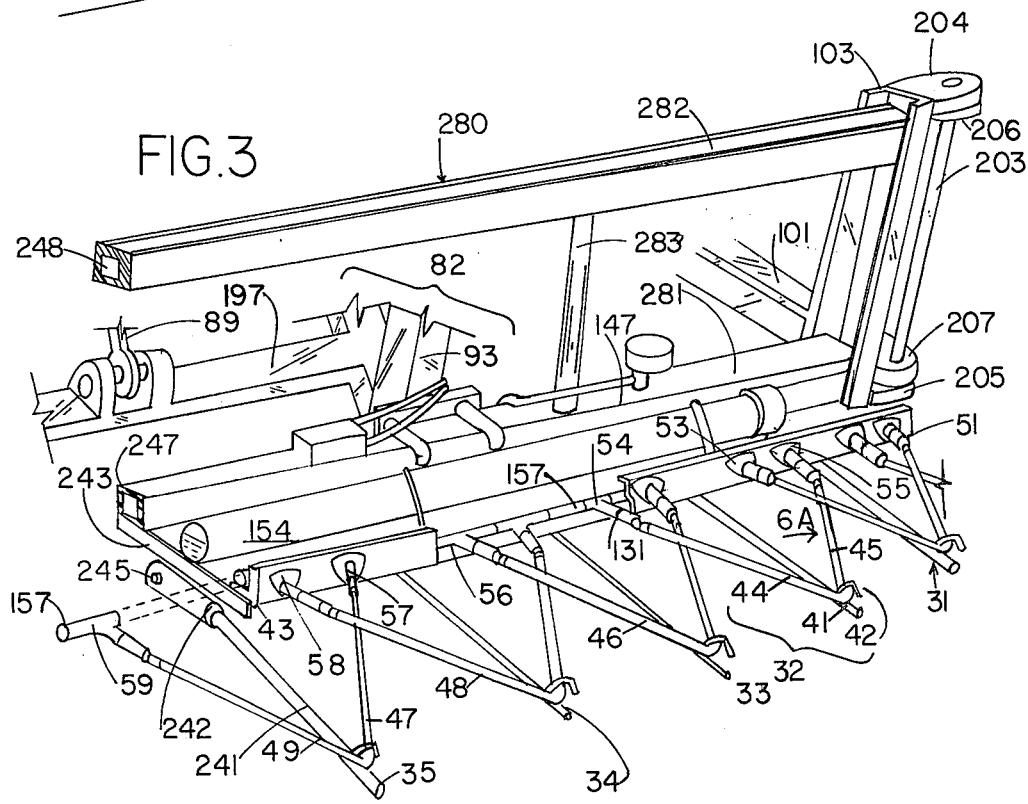
FIG. 3 is a top oblique partly broken away view of structures in a zone as 3A of FIG. 4, in direction of arrow 3B of FIG. 1, to a larger scale than in FIG. 4 and with a structural change.

In each of the beam assemblies 28 and 280, each of a plurality of transversely equispaced horizontally and forwardly and rearwardly extending rigid bracket arms as 243 and 244 is firmly attached to (a) (i) the transversely extending box beam as 81, or 281 as shown in FIG. 3 and (ii) side beams as beam 102 as shown in FIG. 4, (b) to the chemical container or tank in front of the box beam and (c) to the wick support plate as 43 which is a rigid steel angle in front of such tank, as plate 43 in front of tank 154 (as in FIG. 3) and plate 143 in front of side tank 156 (FIG. 4): whereby the wick support plates and chemical tanks are supported on the beams as 81, 101, 102, 281 through such brackets.

Figure 2:
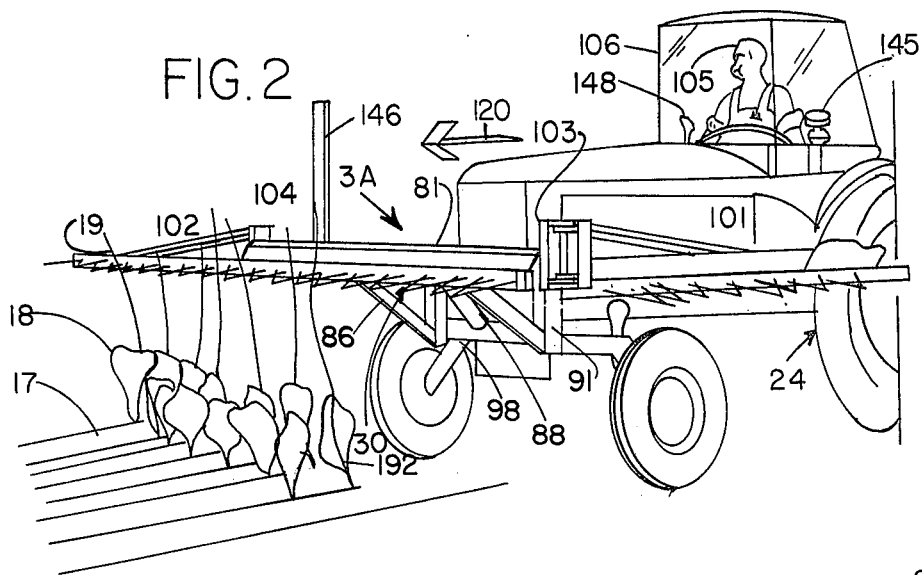
FIG. 2 is a side oblique view of the overall assembly 100 of FIG. 1 with one section of the wick assembly array frame in folded transport position.

The vertical posts 103 and 104 each firmly support laterally extending rigid upper and lower lugs as 204 and 205 on which a rigid vertical pin 203 is firmly supported; the side beams as 101 and 102 each have rigid lugs as 206 and 207 that pivotally engage such pins as 203 and, with the mechanical support provided by the lower lug as 205, provide for pivotal support of each of the side beams as 101 and the components supported thereon, both in the folded position shown in FIG. 2 and the operative laterally extended firm position shown in FIGS. 1 and 4.

In the controlled pressure liquid assemblies as 26 the nozzles 51–59 are rigid plastic tees. The arms of those tees are connected in series with intermediate hose portions, as 178, therebetween to form, together with such intermediate hose portions, the hose manifolds as 157, 158 and 159. The bases of the tees connect to the sleeves as 131 and 132 to which the wick units are connected and both such types of connections are water-tight.

The pressure regulator 153 and gage 143 provide for control of pressure fed to the regulator 145 from manifolds as 147, 148 and 149. The air compressor kit 140 comprises a high pressure air tank 151 and a pump 152 actuated by a power take-off 160 from the engine 149 of the tractor 24. A cut-off valve 185 provides for connection to a tee 186 and feeds through valve 187 to manifold 147.

The gage 146 comprises a vertical glass tube 194 supported on a vertical rigid steel angle 195. The angle 195 is firmly attached to the beam 81 in the embodiments shown in FIGS. 1, 2, 4 and 10 (and to beams 281 and 282 in embodiment shown in FIG. 3) and extends upwards 6 feet from the level of the middle of the wick units. The angle bears a scale 196 marked off in inches. The tube is only partially filled with liquid 161 as within the tank 154, and has a dark colored ball floating at the top of such level of liquid in the tube, so as to indicate to the operator as 105 in the cab the top of the level of such liquid in that glass tube; the tube 194 is ⅜ to ½ inch internal diameter, and is connected at its bottom by a water-tight conduit 198 to the bottom of the tank 154, and so indicates the pressure in that tank in inches of water pressure. The tube and the markings are on the rear side of the angle 195 and so located in the beam support therefor as to face the operator in the cab 106 of the tractor 24. With the particular wick units above described and a watery solution of herbicide the pressure in the tank 154 (and like tanks on the apparatus 20 for the particular wick units shown, and tractor speed (10 mph) and field treated) is kept at 6 inches of water by the operator manipulating the valve 145 as needed; the pressure as shown on gage 146 usually stays at 6 inches within ±⅛ inch during a full days operation and even over very rough terrain varies less than 1 inch during a full day's operation. Valve 145 is a regulator valve providing constant output pressure.

Each rigid wick support bar as 41 and 241 (like bar 41) is firmly attached to the wick support plate as 43 through a rigid sleeve, as 242. Such sleeve as 242 is firmly attached to the wick support plate as 43 and/or a bracket as 243, or beam as 81 and each of the bars as 41 and 241 is adjustably yet firmly held in the sleeve as by set screws as 245 to allow such longitudinal adjustment of the length of bar as 41 and 241 as is needed to keep the corresponding wick unit (44 and 45 on bar 41 and 47 and 49 on bar 241) substantially straight yet without undue tension as might interfere with its deformation by weed structures met thereby in the field. Each of the bars may, alternatively, be spring loaded by a spring attached to the bar 43 and bars as 41 and 241 to maintain a steady tension in the wick units supported at their front ends by each such bar.

In the structural variation of beam assembly 280 shown in FIG. 3 the transverse single box beam of assembly 80 is replaced by two parallel rigid box beams 281 and 282, each firmly joined to the end posts as 103 and 104 and to front vertical members 93 and 94 of the link assembly 82 for greater rigidity and reduced oscillation of the end beams as 101 and 102. The interiors of the beams 281 and 282 are joined by a rigid air-tight conduit 283 to utilize the interior of those beams as a single air-tight manifold to contain high pressure air in the same manner as the interior of beams 81, 101 and 102 are used and such interiors of beams 281 and 282 connect to valve 145 and hose manifolds as 157, 158 and 159 as above described for manifold 147.

While the above description of apparatus and process describe particular preferred embodiments, it must be understood that other wick structures having smaller interfilamentary spaces would be used where the weed surfaces to be met are particularly smooth or require higher pressures or only a little volume of application, while wicks with heavier filaments and larger interfilamentary spaces would be used where weeds with rougher surfaces and higher requirements of volume of liquid application existed and greater tractor speeds were used.

This system also allows effective and efficient application of herbicides to weeds as 193 located in the furrows as 188 between rows of crops as 181–184 by use of supplementary wick units as 251–255. Each of such supplementary wick units as 255 comprises a rigid vertical bar 247 and a lower wick frame 248. The lower wick frame comprises a longitudinally extending rigid bar 249 extending in the forward direction of travel (120) of the tractor 24 and apparatus 100 and a transversely extending bar 259 extending along the width of the furrow, and shorter than the distance between the bottom of the cultivated crops in the rows as 181–184. The transversely extending bar 259 and longitudinally extending bar 249 are firmly joined together at the bottom of the vertical bar 247. The bars as 247 are firmly yet adjustably mounted on beams as 82 and 101 and 102. A furrow level wick unit as 246, like 44 or 45 is connected to a connector hose 256 and the connector hose is connected to a hose manifold as 157, 158 or 159 by connector sleeves as 131. The furrow level wick unit 246 extends diagonally across each furrow as 188 and contacts the weeds located in such furrows and applies herbicide-containing solution thereto when such wick unit contacts the surfaces of such weeds in the furrows. Such wick units as 246 are formed of strands which are formed of finer filaments and with smaller interfilamentary spaces than in the strands used in the wick assemblies 31–39 thereabove. The same pressure (in hose manifolds as 157–159) is applied to the higher or upper level of wick units of wick assemblies as 31–39 and to the lower, furrow level, wick units (whereat the units as 246 are located) but, because of the greater resistance to flow through the lower, furrow level, wicks as 246 there is liquid flow to the surface of those lower, furrow level, wicks from the hose manifold only when such lower furrow levels wicks contact weed surfaces and are deformed thereby as above described for the wick units as 45. The forward end of each lower furrow level wick unit as 246 is plugged by resin at its peripheral portion as 124 (as at sleeve 131 on wick unit 45) and, also, the central portions as 125 and 126 of such end is also plugged with resin, or all portions as 124, 125 and 126 of the front end of such wick unit are covered by a waterproof cap, while the rear end of each such lower, furrow level, wick unit is connected in water-tight fashion by a connector, as 131 on wick unit 45, to the conduit as 256 providing for liquid flow from the hose manifold as 157–159 to such lower furrow level wick unit.

The apparatus 100 may be operated with units as 251–255 to apply herbicide to weeds in the furrows and to weeds extending above the cultivated crops, or to weeds extending above cultivated crops alone, or only to weeds in the furrows.

I claim:

1. Apparatus for dispensing a liquid herbicide agent to weeds lying in a path of travel comprising, in combination:

a support frame movable along the path of travel;

a plurality of stand-off bars projecting forwardly of said support frame in the direction of travel along said path;

a plurality of rope applicators each having end portions mechanically coupled to said support frame on opposite sides of a stand-off bar with an intermediate portion of each rope applicator being engaged and supported by a stand-off bar forwardly of and in spaced relation with said support frame whereby a length of each rope applicator is held in transverse relation to the path of travel and defining an acute angle with respect to the path of travel on opposite sides of each stand-off bar thereby defining a repeating "V" formation; and, means coupled in fluid communication with each rope applicator for wetting an end portion of each rope applicator with the liquid herbicide agent.

* * * * *